United States Patent Office 3,057,821
Patented Oct. 9, 1962

3,057,821
AMMONIUM HALIDE STABILIZED ORGANO-
POLYSILOXANES
Reginald J. Boot, Schenectady, N.Y., assignor to General
Electric Company, a corporation of New York
No Drawing. Filed Aug. 26, 1958, Ser. No. 757,218
6 Claims. (Cl. 260—46.5)

This invention relates to the stabilization of organopolysiloxanes and to organopolysiloxanes of improved properties resulting from this stabilization. More particularly, the present invention relates to the preparation of organopolysiloxanes of improved moisture stability and thermal stability by a process which comprises contacting with an ammonium halide an organopolysiloxane polymerized with an alkali-metal compound which is a basic siloxane rearranging and polymerization agent containing an alkali-metal ion used in the preparation of higher molecular weight organopolysiloxanes from lower molecular weight organopolysiloxanes, the organo groups of the aforesaid organopolysiloxanes being hydrocarbon groups or substituted hydrocarbon groups. This invention is also concerned with the stabilized products prepared by the foregoing process.

It is well known in the art to prepare high molecular weight organopolysiloxanes from lower molecular weight organopolysiloxanes. This process has been carried out in both acid media and under the influence of alkaline catalysts. For a number of reasons, it has been found that the use of alkaline catalysts in much more desirable than the use of acid catalysts in the polymerization of low molecular weight organopolysiloxanes to higher molecular weight materials. Among the most widely used alkaline organopolysiloxane polymerization catalysts are those catalysts which can be described generally as being alkali-metal compounds. For example, octamethylcyclotetrasiloxane, which is a low viscosity fluid, can be converted to an organopolysiloxane gum having a viscosity in excess of one million centipoises by contacting the octamethylcyclotetrasiloxane with a catalytic amount of potassium hydroxide.

Although the alkali-metal compound polymerization of low molecular weight organopolysiloxanes to higher molecular weight materials has gained wide acceptance in the art, there are still a number of disadvantages inherent in the use of this type of polymerization catalyst. The primary disadvantage is that the alkali-metal compound polymerized high molecular weight organopolysiloxane is relatively unstable when exposed to a moist environment, or when subjected to elevated temperatures. It is believed that this lack of stability is due to the catalytic rearrangement or hydrolysis of the high molecular weight material to the lower molecular weight state under the influence of the alkali-metal compound. Because of this lack of moisture stability and thermal stability, it has heretofore been proposed to remove the alkali-metal compound from the high molecular weight organopolysiloxane or to neutralize the alkali-metal compound. However, all of the methods known in the art offer some disadvantages.

For example, one suggested method of removing the alkali-metal compound from the high molecular weight organopolysiloxane is by washing the organopolysiloxane with water. This method offers certain disadvantages in that it is extremely difficult and tedious to wash organopolysiloxanes, whether they be in liquid form or in the form of high molecular weight compounds. In addition, it is necessary to remove the washing water from the gum, thus introducing an additional expensive process step in the preparation of high molecular weight organopolysiloxanes.

Another method suggested for the stabilization of alkali-metal compound polymerizezd organopolysiloxanes is by neutralization of the alkali-metal compound after polymerization has been effected. One such method comprises the addition of acids to chemically neutralize the alkali-metal compounds. Although this procedure satisfactorily eliminates the basicity of the organopolysiloxane, unless the amount of acid added to the organopolysiloxane is carefully controlled, the resulting material is acidic in nature. If the resulting material is acidic, the resulting product is still moisture unstable and thermally unstable. This means that, as a practical matter, whenever acids are employed for neutralization of the alkali-metal catalysts in the organopolysiloxanes, it is necessary to remove the acid from the material. The washing of the resulting material introduces the inherent disadvantages described above.

One effective method for the neutralization of alkali-metal compounds in organopolysiloxanes is the method described and claimed in Patent 2,789,109, Grubb, which comprises the neutralization of alkali-metal compound catalysts by incorporating elemental iodine into the catalyzed organopolysiloxanes, with the subsequent removal of excess iodine by evaporation. Although the process of the Grubb patent can be utilized to prepare perfectly satisfactory organopolysiloxane gums, there are several inherent difficulties in the process. The first of these difficulties is the fact that it is necessary to remove the excess iodine from the neutralized silicone gum. The second difficulty is that iodine is extremely corrosive in nature and is thus difficult to handle.

Another satisfactory method of neutralization of alkali-metal compounds and alkali-metal polymerized organopolysiloxanes is the method described in Patent 2,739,952, Linville. This method comprises the treatment of an alkali metal compound polymerized organopolysiloxane with an organo phosphorus compound capable of reacting with the alkali-metal ion or atom in the alkali-metal compound. For most applications, this method is completely suitable. However, it is sometimes desirable to employ steam distillation to remove low molecular weight materials from alkali-metal compound polymerized high molecular weight organopolysiloxanes. For example, in the preparation of high molecular weight di-methyl-polysiloxane gum from octamethylcyclotetrasiloxane in the presence of potassium hydroxide, it is found that an equilibrium exists between the high molecular weight gum and low molecular weight octamethylcyclotetrasiloxane or intermediate products. Generally, these low molecular weight materials comprise from about 10 to 15 percent, by weight, of the polysiloxanes. For some applications, it is desirable to remove these low molecular weight materials by means of steam distillation, which comprises subjecting the polysiloxane to an atmosphere of steam, which causes volatilization of the low molecular weight materials which are removed with a portion of the steam. When employing the organophosphorus compounds of the aforementioned Linville patent to neutralize the potassium hydroxide, it is sometimes found that the steam causes hydrolysis of the organophosphorus groups, resulting in the formation of alcohols and phosphorus-containing acids. The alcohols are usually removed from the gum during the steam treatment, leaving the acids in the gum. This acid material, of course, is undesirable, since it renders the gum unstable to both moisture and elevated temperatures. Thus, on continued treatment of the gum with steam, the gum reverts to a lower molecular weight state, which adversely affects the properties of silicone rubber prepared from the gum.

It is, therefore, one of the objects of the present invention to improve the thermal stability of organopolysiloxanes which have been polymerized to high molecular weight by alkali-metal compounds.

Another object of the invention is to improve the moisture stability of organopolysiloxanes which have been polymerized to a high molecular weight by means of alkali-metal compounds.

A still further object of the present invention is to provide an improved process of stabilizing alkali-metal compound polymerized organopolysiloxanes so as to permit removal of low boiling or volatile materials by steam distillation.

A still further object of the present invention is to provide alkali-metal compound polymerized organopolysiloxanes having improved thermal stability and moisture stability.

These and other objects of my invention are accomplished by effecting reaction between an ammonium halide, i.e., ammonium fluoride, ammonium chloride, ammonium bromide, ammonium iodide, and an organopolysiloxane which has been polymerized from a low molecular weight state to a high molecular weight state by means of an alkali-metal compound.

As previously mentioned, the organopolysiloxanes which are stabilized by the process of the present invention are organopolysiloxanes which have been polymerized with an alkali-metal compound which is a basic siloxane rearranging and polymerizing agent and which contains an alkali-metal ion. These alkali-metal compounds include the hydroxides of the alkali metals, such as sodium hydroxide, potassium hydroxide, rubidium hydroxide, and cesium hydroxide, as well as other basic materials which contain an alkali-metal ion. Other alkali-metal compounds useful in the practice of the present invention include alkali-metal alkoxides having the formula (1)     MOR where M is an alkali-metal ion, e.g., lithium, potassium, sodium, rubidium, cesium, and R is an alkyl radical, e.g., methyl, ethyl, propyl, isopropyl, butyl, hexyl, etc.; alkali-metal thio-alkoxides having the formula MSR, where M and R have the meanings given above; alkali-metal silanolates having the formula (2)     $(R')_m(OH)_{3-m}SiOM$ where R' is a member selected from the class consisting of alkyl, cycloalkyl, aryl, aralkyl, etc., hydrocarbon radicals; m is an integer equal to from 1 to 2, inclusive, and M has the meaning given above (as shown, for example, in MacMullen Patent 2,587,636); alkali-metal complexes of aromatic compounds (e.g., potassium complexes with naphthalene, anthracene, etc.); alkali-metal complexes having the formula $(ROH)_xMOH$, where R and M have the meanings given above, and x has a value equal to from about 0.5 to 2.5, e.g., a complex of methanol and sodium hydroxide having a neutral equivalent of 74.7, a complex of potassium hydroxide and isopropanol having a neutral equivalent of 167, etc., as well as other compositions of the type described in Warrick Patent 2,634,252; alkali-metal salts of organopolysiloxanes, e.g., the sodium salt of tetramethyldisiloxanediol, etc. (see Hyde Patent 2,634,284).

One of the requirements for the alkali-metal compound is that it be sufficiently alkaline or basic in nature to effect the desired siloxane rearrangement and polymerization of the various organopolysiloxanes with which the present invention is concerned at temperatures of the order of 80 to 175° C. This basicity may be determined by dissolving or dispersing the alkali-metal compound and determining whether it gives a pH above 7, preferable above 10. Adequate basicity may be determined by measuring an aqueous solution or dispersion of the alkali-metal compound at a concentration not greater than 0.1 N, and determining whether it has the desired alkaline pH. An alkali-metal compound of adequate basicity is generally one which, when dissolved or dispersed in water, can be titrated with acids to a neutral end point. The alkali-metal compound may be a suitably basic (i.e., alkaline) compound, which is a salt of a weakly acidic ion such that the compound in contact with water gives an alkaline reaction. Accordingly, the term "alkali-metal compound" is not intended to be limited to the specific types of such compounds specifically described above, but rather is intended to include those as well as other basic alkali-metal compounds capable of acting in the same fashion for the designated purpose.

The process of the present invention is applicable to all types of organopolysiloxanes which have been polymerized from a low molecular weight state to a higher molecular weight state employing an alkali-metal compound to effect the polymerization. Thus, the process is applicable to silicone resins, silicone fluids, and silicone elastomers. However, the invention is particularly applicable to organosilicon fluids and elastomers in which the problem of moisture stability and thermal stability is most pronounced. These organosilicon fluids and gums may be described generically as having the average formula (3) 

where n has a value of from about 1.9 to 2.5, and R'' represents monovalent organic radicals such as various monovalent hydrocarbon and substituted hydrocarbon radicals. Among the specific types of radicals which R'' represents are included, for example, both saturated and unsaturated aliphatic radicals and also aromatic hydrocarbon radicals. Specifically, R'' represents alkyl radicals, e.g., methyl, ethyl, propyl, octyl, octadecyl, etc. radicals; cycloalkyl radicals, e.g., cyclohexyl, cycloheptyl, etc. radicals; aryl radicals, e.g., phenyl, diphenyl, naphthyl, tolyl, xylyl, etc. radicals; aralkyl radicals, e.g., benzyl, phenylethyl, styryl, etc. radicals; olefinically unsaturated aliphatic hydrocarbon radicals, e.g., vinyl, allyl, butenyl, cyclohexenyl, etc. radicals; acetylenically unsaturated hydrocarbon radicals, e.g., ethynl, propynl, etc. radicals; halogenated aromatic hydrocarbon radicals, e.g., chlorophenyl, dibromophenyl, tetrachlorophenyl, etc. radicals; haloalkyl radicals, e.g., chloromethyl, perfluoroethyl, etc. radicals, cyanoalkyl radicals, e.g., cyanomethyl, beta-cyanoethyl, beta-cyanopropyl, gamma-cyanopropyl, etc. radicals. Among the preferred compositions within the scope of Formula 3 above are those in which R'' represents a grouping including vinyl, methyl and phenyl radicals and in which at least 50 percent of the R'' radicals are methyl radicals.

The organopolysiloxanes to which the process of the present invention is applicable are generally well known in the art, and their method of preparation by the polymerization of low molecular weight organopolysiloxanes to higher molecular weight organopolysiloxanes in the presence of alkali-metal compounds is also known.

One class of organopolysiloxanes within the scope of the present invention is the triorganosilyl chain-stopped organopolysiloxane fluids which are prepared by effecting interpolymerization between various organopolysiloxanes, e.g., polydiorganosiloxanes of the formula (4)     $[(R'')_2SiO]_a$ and low molecular weight linear polysiloxanes of the formula (5) 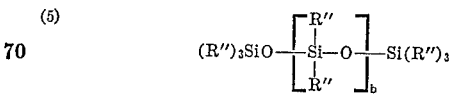

where R'' is as previously defined, a is an integer equal to from 3 to 9 or more, and b is a whole number equal to from 0 to 6, by employing alkaline siloxane rearranging agents, e.g., alkali-metal hydroxides such as sodium hydroxide, potassium hydroxide, lithium hydroxide, rubidium hydroxide, or cesium hydroxide, to obtain long-chain organopolysiloxanes of the formula (6)
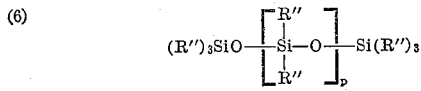

where $p$ is a whole number greater than 1, e.g., from about 6 to 200 or higher. In general, the organopolysiloxane fluids employed in the practice of the present invention should, in the polymerized state, have a viscosity in excess of about 1000 centipoises. Many of the organopolysiloxane fluids within the scope of Formula 6 are disclosed and claimed in Patnode Patents 2,469,888 and 2,469,890, and in Fletcher et al. Patent 2,599,984.

In addition to the triorganosilyl chain-stopped fluids within the scope of Formula 6, fluids employed in the practice of the present invention also include those silanol chain-stopped fluids, such as are prepared by effecting reaction between one or more diorganosiloxanes within the scope of Formula 4 and an alkali-metal compound in the presence of a minor amount, e.g., from about 30 to 1000 or more parts per million of water. This results in organopolysiloxane fluids which are partially or totally chain-stopped with silanol groups. In those cases where the reaction mixture contains a disorganosiloxane within the scope of Formula 4 and a low molecular weight organopolysiloxane within the scope of Formula 5, as well as a minor amount of water, e.g., 30 to 1000 parts per million of water, the resulting product will contain chains which are chain-stopped with both triorganosilyl groups and silanol groups.

In addition to being applicable to the organopolysiloxanes previously disclosed, the process of the present invention is also applicable to those highly viscous masses or gummy elastic solids, depending upon the state of condensation, which have been prepared by the alkali-metal compound polymerization of low molecular weight materials, and which are convertible, e.g., by means of heat, catalysts, or heat and catalysts, to the cured, solid, elastic state. These materials will be referred to sometimes hereinafter as "convertible organopolysiloxanes." Although convertible organopolysiloxanes with which the present invention is concerned are well known, for purposes of showing persons skilled in the art the various convertible organopolysiloxanes which can be employed in the practice of the present invention, attention is directed to the convertible organopolysiloxanes disclosed and claimed in Agens Patent 2,448,756, Sprung et al. Patent 2,448,556, Sprung Patent 2,484,595, Krieble et al. Patent 2,457,688, Marsden Patent 2,521,528, Warrick Patent 2,541,137, and Hyde Patent 2,490,357. It should be understood that the process of the present invention is not limited to use with those organopolysiloxanes convertible to the solid, cured, elastic state, which are disclosed in the aforementioned patents. In addition to the particular convertible organopolysiloxanes of these patents, it should be understood that other convertible organopolysiloxanes containing the same or different silicon-bonded organic substituents may be employed.

The particular convertible organopolysiloxane may be any of those described and well known heretofore which are obtained by condensing or polymerizing in the presence of an alkali-metal compound an organopolysiloxane or mixture of organopolysiloxanes containing an average of from about 1.9 to 2.2, and preferably from about 1.98 to 2.1, organic groups per silicon atom. These convertible organopolysiloxanes generally comprise polymeric diorganopolysiloxanes which may contain, if desired, up to 2 mole percent of copolymerized mono-organosiloxanes, for example, polymerized monomethylsiloxane. Generally, I prefer to use as the starting organopolysiloxane from which the convertible, for example, heat convertible, organopolysiloxane is prepared, one within the scope of Formula 3, in which $n$ has a value of about 1.99 to 2.01 organic groups, e.g., methyl groups per silicon atom, and where more than about 80 percent of the silicon atoms of the polysiloxane contain two silicon-bonded alkyl groups.

The starting organopolysiloxanes used to make the convertible organopolysiloxanes which ultimately can be converted to the cured, solid, elastic state preferably comprise diorganosiloxanes within the scope of Formula 4, wherein one or more different types of diorganosiloxanes are copolymerized to form the convertible organopolysiloxane. In particular, the organopolysiloxane units employed in preparing the convertible organopolysiloxane can be dimethylsiloxane units alone or copolymers of dimethylsiloxane and diphenylsiloxane, copolymers of dimethylsiloxane units, diphenylsiloxane units, and methylphenylsiloxane units, or copolymers of dimethylsiloxane units, diphenylsiloxane units, and methyl-β-cyanoethylsiloxane units.

Previously it has been mentioned that the R" radical of Formula 3 could be a cyanoalkyl radical, in which case the organopolysiloxane contains silicon-bonded cyanoalkyl radicals. The preparation of a number of these cyanoalkyl-containing organopolysiloxanes is described in the copending application of Maurice Prober and Glenn D. Cooper, Serial No. 401,701, filed December 21, 1953, and assigned to the same assignee as the present invention. One method for the preparation of these cyanoalkyl polysiloxanes, e.g., an organopolysiloxane containing a silicon-bonded cyanomethyl radical, comprises the chlorination of octamethylcyclotetrasiloxane by means well known to the art, to form chloromethylheptamethylcyclotetrasiloxane. The Grignard reagent of this latter compound is then prepared in the usual fashion and added to a stirred cyanogen solution in diethyl ether. Rectification of the resulting product yields the cyanomethylheptamethylcyclotetrasiloxane. This latter compound may then be polymerized alone, for example, by heating in the presence of an alkali-metal compound, such as potassium hydroxide, to form an organopolysiloxane gum containing both methyl and cyanomethyl radicals attached to silicon. This gum can then be converted by suitable catalysts to the solid, cured, elastic state. In addition to polymerizing cyanomethylheptamethylcyclotetrasiloxane alone, this compound can also be copolymerized with other siloxanes such as octamethylcyclotetrasiloxane or octaphenylcyclotetrasiloxane to form organopolysiloxanes containing any desired organic substituents, in addition to the cyanomethyl group. Instead of forming gums from the cyanomethylheptamethylcyclotetrasiloxane, linear chain-stopped fluids may be formed by polymerizing the cyanomethylheptamethylcyclotetrasiloxane in the presence of a chain-stopping compound such as hexamethyldisiloxane.

Organopolysiloxanes within the scope of Formula 3 can also be formed by using as a starting material an organopolysiloxane containing silicon-bonded beta-cyanoethyl radicals or higher alkyl radicals containing carbon-bonded nitrile groups. Thus, beta-cyanoethyl heptaethylcyclotetrasiloxane can be formed by chlorinating octaethylcyclotetrasiloxane to form beta-chloroethylheptaethylcyclotetrasiloxane, forming the Grignard reagent of the latter compound, and reacting the Grignard reagent with an ether solution of cyanogen. The beta-cyanoethyl heptaethylcyclotetrasiloxane is converted to an organopolysiloxatne fluid or gum by the methods previously described.

An alternative method of forming organopolysiloxanes containing silicon-bonded cyanoalkyl radicals in which the nitrile group is attached to at least the carbon atom which is beta to silicon is the method of the copending application of Maurice Prober, Serial No. 401,702, filed December 21, 1953, and assigned to the same assignee as the present invention. By the method of this Prober application, a hydrolyzable silicon hydride, such as methyldichlorosilane, is added to an olefinically unsaturated nitrile, such as acrylonitrile or allyl cyanide. By this process, the silicon hydride adds across the double bond of the unsaturated nitrile to form a hydrolyzable cyanoalkylsilane. In the two cases specifically mentioned, the product would comprise beta-cyanoethylmethyldichlorosilane and gamma-cyanopropyl methyldichlorosilane. These dichlorosilanes may be hydrolyzed in the usual fashion to form organopolysiloxanes of recurring methylcyanoalkylsiloxane units. These siloxanes can then be polymerized by alkali-metal compounds either alone or with other organopolysiloxanes to form fluids and elastomers which are convertible to the solid, cured, elastic state.

Although a number of different types of organopolysiloxanes have been specifically described for use in the present invention, it should be understood that no criticality exists with regard to the type of organopolysiloxane. Thus, any of those organopolysiloxanes specifically described above may be employed or any other type of organopolysiloxane, so long as the organopolysiloxane in its high molecular weight state has been prepared from a lower molecular weight organopolysiloxane by polymerization in the presence of an alkali-metal compound. The amount of alkali-metal compound emplyed in the polymerization is not critical to the process of the present invention. However, the amount of alkali-metal compound generally used in the preparation of high molecular weight organopolysiloxanes from lower molecular weight materials generally ranges in amount from about 0.001 to 1 percent by weight, calculated as the alkali-metal hydroxide, based on the weight of the organopolysiloxane being polymerized. The use of the alkali-metal compound in this range produces satisfactory polymerization and no particular benefit is derived from using less than 0.001 percent by weight, or more than about 1 percent by weight, of the alkali-metal compound. The particular physical conditions under which the alkali-metal compound polymerization takes place are also not critical. Thus, the reaction generally is effected at a temperature of from about 80 to 175° C., since satisfactory reaction rates are found in this temperature range. The use of reaction temperatures below about 80° C. offers a disadvantage in that the reaction rate is relatively slow. No particular advantage is observed from carrying out the polymerization at a temperature much above 175° C. Generally, the polymerization reaction is carried out at atmospheric pressure, but the use of sub-atmospheric or super-atmospheric pressure is not precluded.

The alkali-metal compound employed in the polymerization reaction is stabilized by merely contacting the alkali-metal compound-containing polymerized organopolysiloxane with an ammonium halide by any suitable method. Thus, a solid powdered ammonium halide, for example ammonium chloride or ammonium iodide, can be added to the polymerized organopolysiloxane and the mixture stirred so as to assure complete dispersion of the ammonium halide in the polymerized material. This dispersion can be accomplished in the case of polymerized organopolysiloxane fluids by merely stirring a mixture of the powdered ammonium halide in the fluid for a sufficient time to insure that stabilization of the alkali-metal compound has been effected. The time required for effecting this stabilization is relatively short, varying from a few minutes up to four hours or more, depending on the viscosity of the fluid. Since the ammonium halide has only a limited solubility in organosilicon compounds, it will be found that a suspension of ammonium halide exists in the fluid after stabilization. The suspension may be easily removed by filtration if clarity of the polymerized fluid is an important factor. Where clarity is not an important factor, the ammonium halide may be left dispersed in the fluid, since the presence of the ammonium halide had no adverse effect on the moisture resistance or thermal stability of the fluid. In addition to stabilizing the alkali-metal compound in polymerized organopolysiloxane fluids with solid ammonium halides, it is also possible to employ solutions of the ammonium halide, such as aqqueous solutions, alcoholic solutions, or solutions or suspensions of the ammonium halide in organic solvents such as hydrocarbon solvents including benzene, toluene, xylene, or in other organic solvents such as carbon disulfide or carbon tetrachloride. When employing solutions or suspensions of the ammonium halide for stabilization, the solution or suspension is merely added to the organopolysiloxane fluid and the resulting mixture is stirred for a sufficient time to effect stabilization. Again, the time can vary from a few minutes up to several hours, depending on the viscosity of the fluid and the particular solution or suspension of ammonium halide employed. At the end of this time, the solvent for the ammonium halide is separated from the organopolysiloxane by decantation if the solvent is insoluble in the organopolysiloxane as in the case of water or by distillation in the case of a number of the organic solvents.

In treating solid alkali-metal compound polymerized organopolysiloxane gums by the process of the present invention, the same techniques can be employed as in the case with fluids. Thus, the powdered ammonium halide can be dispersed in the solid material or a solution of the ammonium halide in water or one of the aforementioned organic solvents may be dispersed in the solid. Mixing of the ammonium halide with the organopolysiloxane gum is usually accomplished by the use of differential rubber milling rolls, a Banbury type mixer or a laboratory doughmixer, so as to insure uniform dispersion of the ammonium halide and obtain complete stabilization of the alkali-metal compound in the organopolysiloxane. Again, the time of contact of the ammonium halide with the organopolysiloxane gum is not critical, satisfactory stabilization having been obtained with times as low as several minutes to times up to several hours. In the case of these organopolysiloxane gums, there is no necessity for removing any excess of ammonium halide from the gum.

The amount of ammonium halide employed in the stabilization of alkali-metal compound polymerized organopolysiloxanes is not critical, the only requirement being that there be sufficient ammonium halide to react wih all of the alkali-metal compound. Although the exact mechanism of the reaction involved in the present invention is not known with certainty, it has been found that the ammonium halide and the alkali-metal compound react on a hole-for-mole basis, so that one mole of ammonium halide is required for each mole of alkali-metal in the polymerized organopolysiloxane. The use of molar excesses of the ammonium halide offers an advantage in that a shorter time is required to effect complete stabilization of the alkali-metal compound. Thus, in the preferred embodiment of our invention, we employ from about 1.5 to 20 moles of the ammonium halide per mole of alkali-metal compound in the organopolysiloxane.

The temperature at which the stabilization is effected is again not critical, satisfactory stabilization being obtained at room temperature, e.g., a temperature of around 20° C. However, the use of temperatures below room temperature, or of elevated temperatures, such as temperatures of the order of 80 to 150° C., is not precluded, although no particular advantage is derived therefrom.

In order that those skilled in the art may better understand how the present invention may be practiced, the following examples are given by way of illustration and not by way of limitation.

EXAMPLE 1

A polydimethylsiloxane gum was prepared by heating a mixture of octamethylcyclotetrasiloxane and 0.005 percent by weight, based on the weight of the siloxane, of solid potassium hydroxide at a temperature of about 160° C. for four hours, during which time the consistency of the mixture changed from that of a low molecular weight fluid to a high molecular weight solid gum, having a viscosity in excessh of about 10,000,000 centipoises. A first portion of this gum was kept as a contro and a second portion was stabilized by adding thereto a sufficient amount of a 1 percent aqueous solution of ammonium chloride to provide about 16 moles of ammonium chloride per mole of potassium hydroxide used as a polymerization catalyst. The ammonium chloride solution was dispersed in the gum by milling in a small doughmixer for one-half hour at a temperature of from about 25-60° C. Both the control and the stabilized gum were then placed on a surface heated to a temperature of 400° C. and left on the surface for 15 minutes while a slowly moving stream of moist nitrogen was passed over the material to provide moisture and sweep away volatile materials. At the end of this time, the weight loss of the control and the stabilized polymer was measured. The control had a weight loss of 58.7 percent, while the ammonium chloride stabilized gum exhibited a weight loss of only 12.7 percent. This 12.7 percent represented removal of the volatile low molecular weight siloxanes in the gum, rather than any deficiency in the thermal and moisture stability of the gum.

EXAMPLE 2

This example illustrates the stabilization of a methylphenylsiloxane gum by the method of the present invention. A gum having a viscosity in excess of 1 million centipoises wasp repared by polymerizing a mixture of octamethylclcyotetrasiloxane and octaphenylcyclotetrasiloxane in the ratio of 1 mole of the octamethyl compound per 0.056 mole of the octaphenyl compond. This mixture also contained 0.01 percent potassium hydroxide based on the weight of the polysiloxanes. The polymerization was effected by heating the mixture at a temperature of about 150° C. for six hours. The resulting gum was mixed with a sufficient amount of a 1 per cent aqueous solution of ammonium chloride by the method of Example 1 so as to provide 2.0 moles of ammonium chloride per mole of potassium hydroxide used as a polymerization catalyst. After subjecting this material to the test described above (heated surface at 400° C. for 15 minutes in a moist nitrogen stream), the weight loss of the polymer was 12.3 percent, which is accounted for by low molecular weight volatile materials in the gum. When an untreated portion of the same gum was subjected to this test, the polymer completely vaporized.

EXAMPLE 3

A silicone fluid having a viscosity of approximately 7500 centipoises was prepared by heating a mixture of octamethylcyclotetrasiloxane and octaphenylcyclotetrasiloxane in the ratio of approximately 18 moles of the former siloxane per mole of the latter siloxane in the presence of either 0.001 percent, by weight of potassium hydroxide, or a mixture of 0.001 weight percent of potassium hydroxide and 0.0002 weight percent cesium hydroxide. The reaction took place in the presence of approximately 1000 parts per million of water so that the resulting oil was chain-stopped with silanol groups. In order to compare the effect on cure time in a room temperature vulcanization system, with stabilization according to the process of the present invention, as compared with prior art stabilization methods, some of the fluids described above were stabilized with phosphoric acid and others were stabilized with ammonium iodide. The stabilization was effected by stirring a mixture of the organopolysiloxane fluid with a 1 percent aqueous solution of either phosphoric acid or ammonium iodide for about 60 minutes while the polymer was still at polymerization temperature, 160° C. Excess $H_2O$ boiled out. The phosphoric acid or ammonium iodide was present in an amount equal to 0.01 weight percent, based on the weight of the siloxanes. The stabilized organopolysiloxanes thus produced were then cured at room temperature by mixing the stabilized fluid with a solution of tin octoate in a partially hydrolzed ethyl silicate. The ethyl silicate contained approximately 40 percent $SiO_2$ and the ratio of tin octoate to ethyl silicate was approximately 1:3. In each case, approximately 4 percent, by weight, based on the weight of the organopolysiloxane of the ethyl silicate-tin octoate catalysts was employed. The time required to cure each fluid to the solid, elastic state was measured after the fluid had been devolatized to remove low molecular weight materials. The material was considered to be cured when it became an elastic gel. In the table below are listed the alkali-metal catalyst used in the polymerization of the cyclotetrasiloxanes to the 7500 centistokes viscosity fluid, the stabilization reagent, and the time required for curing of the fluid to the solid, elastic state.

*Table 1*

| Alkali-Metal Catalyst | Stabilization Reagent | Cure Time, min. |
|---|---|---|
| KOH | $H_3PO_4$ | 9.4 |
| KOH+CsOH | $H_3PO_4$ | 14.5 |
| KOH | $NH_4I$ | 2.0 |
| KOH+CsOH | $NH_4I$ | 2.5 |

As shown by the table above, the use of the ammonium halide for stabilization of the alkali-metal compound provides the completely unexpected and unpredictable advantage of a much more rapid temperature cure of silicone materials than is obtained from silicone materials which are stabilized with prior art materials such as phosphoric acid.

EXAMPLE 4

A methylphenylpolysiloxane gum was prepared by copolymerizing a mixture of octamethylcyclotetrasiloxane and octaphenylcyclotetrasiloxane in the ratio of approximately 18 moles of the former per mole of the latter in the presence of about 15 parts per million of potassium hydroxide, based on the weight of the organopolysiloxanes. This gum was chain-stopped almost completely with silanol groups. A first portion of this gum was treated with phosphoric acid by the method of Example 1, with the ratio of phosphoric acid on a molar basis to potassium hydroxide being 1.5. A second portion of this gum was treated with ammonium iodide for stabilization of potassium hydroxide and with the ratio of ammonium iodide to potassium hydroxide being approximately 1.5. By the method of Example 1, the thermal stability and moisture stability of these gums were examined. In this examination, it was found that the phosphoric acid-containing gum exhibited an 18 percent decrease in average molecular weight, with the release of approximately 2 percent of volatiles, indicating that reversion of the gum had occurred. On the other hand, the ammonium iodide treated gum actually, showed a 10 percent increase in average molecular weight, with a loss of 5.3 percent volatiles, indicating that no reversion of the organopolysiloxane had occurred.

EXAMPLE 5

This example illustrates the neutralization of an alkali-metal compound polymerized gum containing both silicon-bonded methyl and silicon-bonded gamma-cyanopropyl radicals. Gamma-cyanopropylmethyldichlorosilane was prepared by heating equal molar amounts of methyldichlorosilane and allyl cyanide in the presence of about 10 percent, by weight, of a platinum charcoal catalyst for eight hours at 110° C. The reaction mixture was rectified to produce the gamma-cyanopropylmethyldichlorosilane. This chlorosilane was hydrolyzed by the slow addition of 1 part of the chlorosilane to 4 parts of ice water. The resulting oil layer was then separated and rectified to give a clear oil consisting essentially of recurring gamma-cyanopropylmethylsiloxane units and had a viscosity of about 500 centipoises at 25° C. About 530 parts, by weight, of this oil was added to 470 parts, by weight, of octamethylcyclotetrasiloxane and 0.0045 part, by weight, of potassium hydroxide. The resulting mixture was heated at a temperature of about 150° C. for 4 hours under a stream of dry $N_2$, resulting in a copolymer having a viscosity of about 0.8 million centipoise and containing an average of approximately 40 mole percent methyl-gamma-cyanopropylsiloxane units and 60 mole percent dimethyl-siloxane units. This oil was mixed with sufficient ammonium iodide as a 10 percent aqueous solution of ammonium iodide to provide 10 moles of ammonium iodide per mole of potassium hydroxide. The resulting material was steam stripped for 2 hours at 135° C. and tested in accordance with the procedure of Example 1 to determine its thermal stability and moisture resistance. At the end of the 15-minute test, at 400° C. the ammonium iodide treated gum exhibited a weight loss of only about 12 percent. A similar gum which had not been treated with ammonium iodide exhibited a weight loss of over 90 percent under similar test conditions.

EXAMPLE 6

This example illustrates the stabilization of a silicone elastomer with ammonium bromide. A polydimethylsiloxane gum was prepared by mixing octamethylcyclotetrasiloxane with 5 parts per million of potassium hydroxide and heating the mixture at a temperature of about 150° C. for about 6 hours. This gum was then stabilized by dispersing a sufficient amount of a 1 percent aqueous ammonium bromide solution therein to provide 40 parts per million of the bromide. This mixing was accomplished in one-half hour's time on a doughmixer at a temperature of about 40° C. This material was subjected to the test described in Example 1 (heated surface at 400° C. for 15 minutes in a moist nitrogen stream). This resulted in a weight loss of 12.1 percent, which is accounted for by low molecular weight materials in the gum.

EXAMPLE 7

This example illustrates the stabilization of a methyl phenyl vinyl silicone gum with ammonium chloride and the steam stripping of the resulting gum. A mixture of 100 parts, by weight, of octamethylcyclotetrasiloxane, 15 parts, by weight, of octaphenylcyclotetrasiloxane, 0.23 part of 1,3,5,7-tetramethyl-1,3,5,7-tetravinylcyclotetrasiloxane, and 0.001 percent, by weight, of potassium hydroxide, based on the weight of the siloxanes, was heated at a temperature of about 160° C. for 4 hours to produce a high molecular weight gum. This gum was added to a doughmixer and was mixed for 30 minutes with about 0.002 part, by weight, of ammonium chloride which was added as a 1 percent aqueous solution. A sample of this stabilized gum tested in accordance with the procedure of Example 1 exhibited a weight loss of only 11.9 percent. Another portion of this gum was steam stripped for 4 hours at 160° C. without any evidence of degradation of the gum, thus indicating that steam distillation is a suitable method of removing low molecular weight materials from gums stabilized by the process of the present invention.

A silicone rubber was prepared from the ammonium chloride treated steam stripped gum of Example 7 by compounding 100 parts of the gum with 40 parts of finely divided precipitated silica (HiSil X–303) and 0.6 part of benzoyl peroxide on differential rubber milling rolls. At the end of this time, the compounded product was cured for one hour at a temperature of 300° C., yielding a cured silicone rubber having a tensile strength of 840 p.s.i., elongation of about 300 percent, and a Shore A hardness of 70.

Although the foregoing examples have, of necessity, been limited to only a few of the many possible types of alkali-metal compounds polymerized organopolysiloxanes, it is again emphasized that the ammonium halide stabilization of the present invention is applicable to any type of organopolysiloxane which has been prepared by polymerization of a low molecular weight organopolysiloxane to a higher molecular weight organopolysiloxane employing an alkali-metal compound polymerization catalyst. In particular, the present invention is applicable to those organopolysiloxanes having viscosities of from about 1000 centipoises to over 30 million centipoises. However, it should also be understood that our process is applicable to alkali-metal compound polymerized organopolysiloxanes having molecular weights below 1000 centipoises, as well as to alkali-metal catalyzed silicone resins, e.g., those resins in which the ratio of organo groups to silicon atoms is below about 1.9, e.g., from about 1.1 to 1.7.

The organopolysiloxanes prepared by the method of the present invention have the same utility as prior materials. Thus, the organopolysiloxane resins may be employed as molding compounds, for example, in the encapsulation of electrical equipment. The fluid organopolysiloxanes are useful as substitutes for hydraulic fluids, as lubricants, as heat transfer fluids, etc. The organopolysiloxane gums, which can be converted to silicone rubbers by methods well known in the art, are useful as prior art silicone rubbers, i.e., as coatings for wires, as gasket materials, for the encapsulation of electrical apparatus, for shock absorbers, etc.

What I claim as new and desire to secure by Letters Patent of the United States is:

1. A composition of matter of improved thermal stability and moisture stability which composition comprises the product obtained by dispersing an ammonium halide selected from the class consisting of ammonium fluoride, ammonium chloride, ammonium bromide and ammonium iodide in an organopolysiloxane polymerized with an alkali-metal compound which is a basic siloxane rearranging and polymerizing agent containing an alkali-metal ion used in the preparation of higher molecular weight organopolysiloxanes from lower molecular weight organopolysiloxanes, said organopolysiloxane being convertible to the solid, cured, elastic state and containing an average of from 1.99 to 2.01 organic groups per silicon atom, the organo groups of said organopolysiloxane being attached to silicon through carbon-silicon linkages and being selected from the class consisting of monovalent hydrocarbon radicals, halogenated monovalent hydrocarbon radicals, and cyanoalkyl radicals.

2. The composition of claim 1 in which the alkali-metal compound is an alkali-metal hydroxide.

3. The composition of claim 1 in which the organo groups of said organopolysiloxane consist of monovalent hydrocarbon radicals.

4. The composition of claim 1 in which the ammonium halide is ammonium chloride.

5. The composition of claim 1 in which the ammonium halide is ammonium iodide.

6. A composition of matter of improved thermal stability and moisture stability which comprises the product obtained by dispersing ammonium iodide in a methylphenylpolysiloxane convertible to the solid, cured, elastic state which methylphenylpolysiloxane has been polymerized from a low molecular state to a higher molecular weight state with potassium hydroxide, the methyl and phenyl groups of said methylphenylpolysiloxane being attached to silicon through carbon-silicon linkages.

(References on following page)

References Cited in the file of this patent

UNITED STATES PATENTS

| | | |
|---|---|---|
| 2,489,138 | Hyde et al. | Nov. 22, 1949 |
| 2,490,357 | Hyde | Dec. 6, 1949 |
| 2,507,200 | Elliot et al. | May 9, 1950 |
| 2,521,674 | Britton et al. | Sept. 12, 1950 |
| 2,521,678 | White et al. | Sept. 12, 1950 |
| 2,632,736 | Currie | Mar. 24, 1953 |
| 2,787,274 | Gant et al. | Apr. 2, 1957 |

OTHER REFERENCES

Inorganic Chemistry, Moeller (John Wiley and Sons, Inc.) (1953), p. 311.